(12) United States Patent
Richard

(10) Patent No.: US 7,884,313 B2
(45) Date of Patent: Feb. 8, 2011

(54) SENSOR ARRANGEMENT FOR DETECTING A LIQUID ON A SURFACE OF AN INTRUSION DETECTOR

(75) Inventor: Matthieu Richard, Fourcatier (FR)

(73) Assignee: Robert Bosch GmbH, Stuttgart (DE)

( * ) Notice: Subject to any disclaimer, the term of this patent is extended or adjusted under 35 U.S.C. 154(b) by 920 days.

(21) Appl. No.: 10/581,832

(22) PCT Filed: Jun. 28, 2005

(86) PCT No.: PCT/EP2005/053042

§ 371 (c)(1),
(2), (4) Date: Jun. 5, 2006

(87) PCT Pub. No.: WO2007/000187

PCT Pub. Date: Jan. 4, 2007

(65) Prior Publication Data

US 2009/0039296 A1 Feb. 12, 2009

(51) Int. Cl.
*G06M 7/00* (2006.01)
(52) U.S. Cl. .................. 250/221; 340/556; 340/539.31; 250/576
(58) Field of Classification Search .................. 250/221, 250/349, 216, 214 AL, 338.1, 239, 576, 556, 250/573; 340/555–557, 565–567, 539.31, 340/539.1, 568.2; 348/143, 163, 37
See application file for complete search history.

(56) References Cited

U.S. PATENT DOCUMENTS

| | | | |
|---|---|---|---|
| 4,998,022 A * | 3/1991 | Tregay | 250/577 |
| 5,499,016 A | 3/1996 | Pantus | |
| 5,942,976 A | 8/1999 | Wieser et al. | |
| 5,997,121 A * | 12/1999 | Altfather et al. | 347/7 |
| 6,262,661 B1 | 7/2001 | Mahler et al. | |
| 6,469,625 B1 * | 10/2002 | Tomooka | 340/556 |
| 6,626,510 B2 * | 9/2003 | Maeda | 347/7 |
| 7,274,032 B2 * | 9/2007 | Mosteller et al. | 250/556 |

FOREIGN PATENT DOCUMENTS

| | | |
|---|---|---|
| DE | 32 29 188 | 3/1994 |
| EP | 0 660 284 | 6/1995 |
| EP | 0 817 148 | 1/1998 |
| JP | 6-28715 | 4/1994 |
| JP | 2002-181695 | 2/2002 |
| JP | 2005-140635 | 6/2005 |

* cited by examiner

*Primary Examiner*—Thanh X Luu
*Assistant Examiner*—Francis M Legasse, Jr.
(74) *Attorney, Agent, or Firm*—Michael J. Striker

(57) ABSTRACT

A sensor arrangement includes at least one transparent elevation, which is formed on the surface. The transparent elevation is made of a first transparent material. At least one first facet of the transparent elevation defines a first angle with the surface. This first angle is larger than an angle at which a total-reflection occurs at an interface of the first transparent material and air and is at the same time smaller than an angle at which a total reflection occurs at an interface of the first transparent material and the liquid. A light source is arranged for emitting an incident ray into a first direction passing through the surface into the transparent elevation such that in a presence of a liquid at the first facet, an incident ray is transmitted through the first facet. In an absence of a liquid, the incident ray is reflected due to a total reflection at the facets. A light detector is provided for detecting the reflected ray.

9 Claims, 8 Drawing Sheets

SENSOR ARRANGEMENT FOR DETECTING A LIQUID ON A SURFACE OF AN INTRUSION DETECTOR

STATE OF THE ART

The present invention relates to a sensor arrangement for detecting a liquid on a surface. In particular, the present invention relates to an infrared intrusion detection system having such a sensor for detecting a sabotage of the infrared intrusion detection system via such a liquid film.

Although the present invention can in principle be applied to any sensor arrangement for detecting a liquid on a surface, the invention and its underlying problems will hereinafter be explained with regard to a precaution measure against spray attacks on infrared intrusion detectors.

Passive infrared intrusion detectors are commonly used to monitor areas at specific times, for example museums, banks and industrial areas during the night. Such infrared intrusion detectors are able to detect infrared body radiation in the mid infrared range from approximately 6 to 15 μm. A sketch of such an infrared intrusion detector is illustrated in FIG. 1. It primarily consists of an infrared detector 91 in a housing 90 having an entrance window 92. Thus, the body radiation of a person bypassing the infrared sensor falls onto the infrared sensor 91. Its light induced electric signals are compared to threshold values and an intrusion alarm signal may be initiated accordingly.

During the day, the infrared intrusion detectors are usually in a stand-by mode such that people may pass the respective areas without initiating an alarm. At this time, the entrance windows 92 can be masked with a solid cover. However, these covers can be easily spotted by the security personnel. Another sabotage technique uses sprays 94 deposited onto the surface of the entrance window 92. These liquids are opaque in the range from 6 to 15 μm, thus rendering the infrared sensor 91 virtually blind. Additionally, they may be transparent in the visual wavelength range. Thus the spray can not be detected by the security staff. Such a sabotage is most likely to be successful.

EP 0 660 284 B1 monitors the transmission of an entrance window of an infrared intrusion detection system by a near infra-red light emitter placed in front of the entrance window and a corresponding light detector placed opposite to the light emitter at the backside of the entrance window. The wavelength of the near infra-red emission is chosen not to interfere with the mid infra-red light detector of the infrared intrusion detection system. Thus, this device is not able to detect a liquid being clear or transparent in a near infrared but opaque in the mid-infrared range.

U.S. Pat. No. 5,942,976 uses a light source and a light sensor, wherein an optical diffraction grating structure focuses first- and higher-order diffraction rays of a light source onto the light sensor. This focusing effect vanishes when a spray is applied onto the grating structure. The drop in the detected light intensity triggers a sabotage alarm signal. Disadvantageously, these diffractive structures are difficult to manufacture in low-cost plastic material and are not very reliable due to their high sensitivity to dust and greasy atmosphere.

U.S. Pat. No. 5,499,016 detects the radiation of a reflection at the entrance window by illuminating the outside of the window with a near infrared light emitter. This technique can be only applied when the entrance window is plan, however, now the shape of the entrance windows is often curved. Additionally, this detection system is not sensitive to a spray being transparent in the near infrared range.

EP 0 817 148 B1 uses light-conducting means in the area of the entrance window. A spraying attack changes the reflection properties of the light pipes and thus the guiding properties. The detection of these guiding properties may be used for generating an alarm signal. However, the reflection properties are not very sensitive to a spray being transparent in the visual wavelength range.

ADVANTAGE OF THE PRESENT INVENTION

The present invention provides an improved sensor of detecting a coverage of a surface with a liquid film. The sensor shows the features of claim 1.

The sensor arrangement according to the present invention comprises at least one transparent elevation, which is formed on the surface. The transparent elevation is made of a first transparent material. A first facets of the transparent elevation defines a first angle with the surface. This first angle is larger than an angle at which a total (internal) reflection occurs at an interface of the first transparent material and air and is at the same time smaller at an angle at which a total reflection occurs at an interface of the first transparent material and the liquid. A light source is arranged for emitting an incident ray into a first direction passing through the surface into the transparent elevation such that in presence of a liquid at the first facet an incident ray will be transmitted through the first facet, wherein in absence of a liquid the incident ray will be reflected due to a total reflection at the facets. Additionally, a light detector is provided for detecting the reflected ray.

A principle idea behind the present sensor resides in the fact that a total reflection at the elevations vanishes when a liquid is deposited onto the elevations. A total reflection at the interface elevation air occurs at smaller angles than for interfaces of an elevation to liquid. The first angles are carefully chosen to be sufficiently large such that an incident ray will be subdued to a total reflection at an elevation-air interface. However, the first angles do not exceed an angle such that a total reflection at an elevation-liquid interface may occur.

In a refinement the elevation are formed with a triangular or trapezoid cross-section. A particular suitable shape is a tetrahedron shape. These elevations provide three facets back-reflecting an incident ray substantially to its emission point in three dimensional space. The first direction may be substantially perpendicular to the surface.

According to a preferred embodiment at least one second elevation having a second facet is formed adjacent to a first facet of a first elevation wherein the second facet defines a second angle with the surface, wherein the second angle is larger than 75°, such that capillarity effects are enhanced. The capillarity effect improves a uniform dispersion of a liquid on the surface and the elevations.

According to refinements the first transparent material of the elevations has a refractive index of more than about 1.5 and the first angle is in the range of 42° to 60°.

According to a refinement the angle between the 3 upper facets of the tetrahedron elevations are different than 90°. Thus the reflection at the elevations has a slightly angular dispersive character and the reflected rays are not exactly anti-parallel to the incident rays. Thus reflected and incidents rays are spatially separated and mirrors or the like can be used to separate the reflected from the incident rays.

In a preferred embodiment a second light detector is provided for detecting a ray reflected at an object placed in front of the elevations. Thus a non-liquid object may be detected due to their reflective and scattering surface properties reflecting light from rays emitted by the light source. It can be assumed that there will be always a fraction of the rays passing the elevations due imperfections in their manufacturing process or by flat areas provided by purpose.

In an other embodiment the second elevations are provided with a top facet being substantially parallel to the surface or regions such that a ray emitted via a signalizing optical light source passes the elevation at the top facet.

In a refinement the light source and/or the light detector comprises a wave guide.

DRAWINGS

Embodiments of this invention will be explained in further detail with respect to the accompanying Figures. In the Figures:

FIG. 1 depicts a commonly known infrared intrusion detector for illustrating an underlying problem of the present invention;

FIG. 2 graphically illustrates principles of a total reflection;

DETAILED DESCRIPTION OF THE EMBODIMENTS

In the Figures, identical reference signs denote identical or equivalent parts, if not denoted otherwise.

Figure 1:
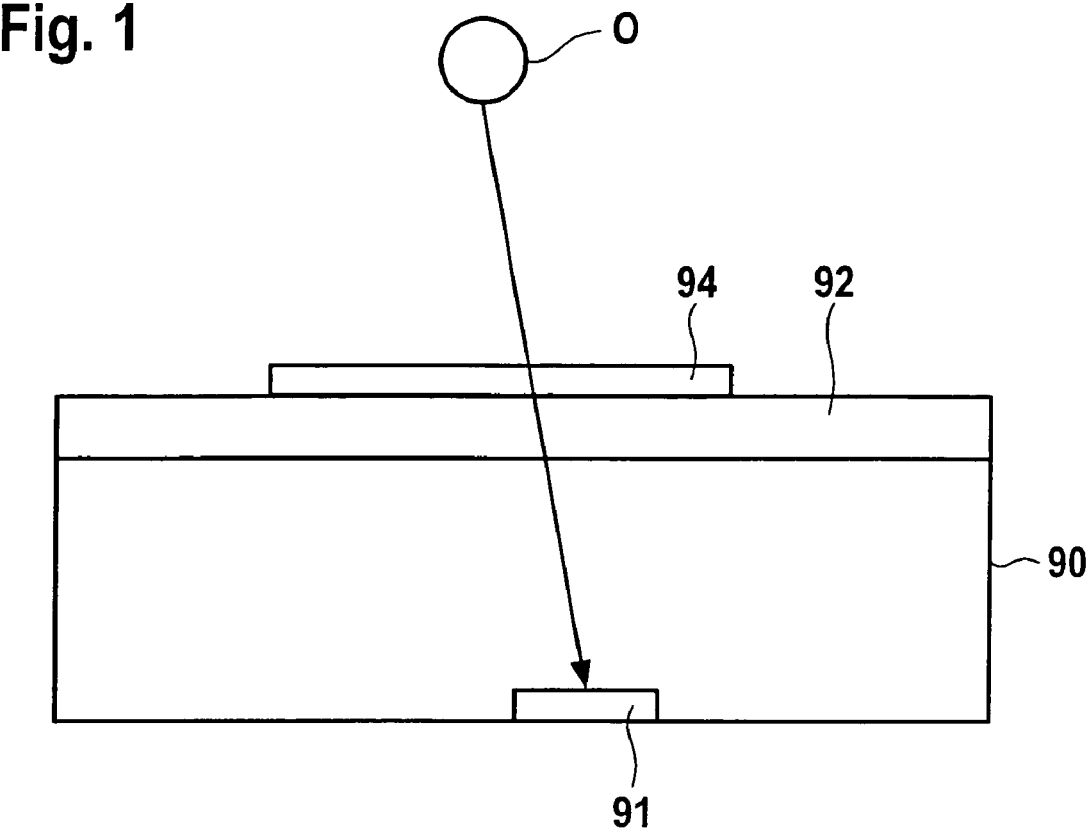
Figure 2:
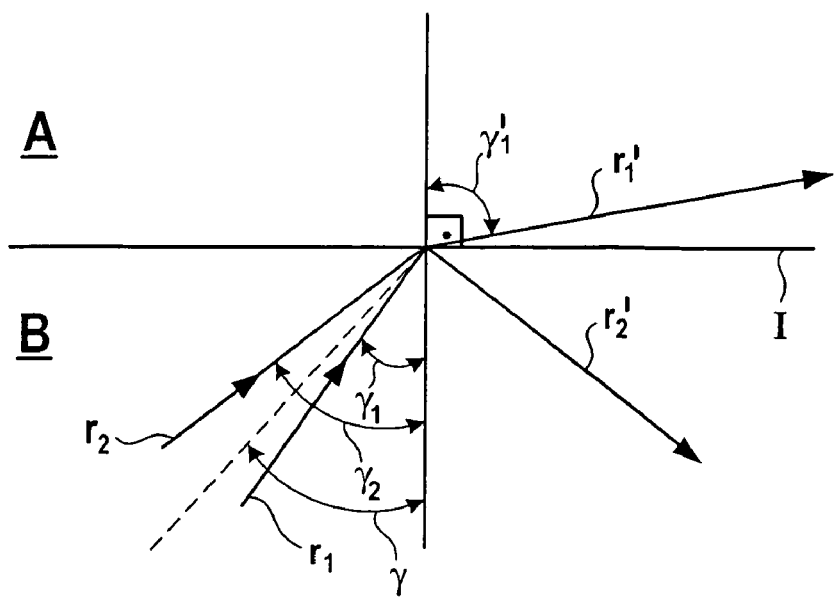

A basic physical principle used in all embodiments of the present invention is a total reflection of a ray at an interface formed by two transparent materials having a different refractive index. FIG. 2 schematically illustrates this commonly known effect. A first material A and a second material B are forming an interface 1. A first refractive index $n_1$ of the first material A is lower than a second refractive index $n_2$ of the second material B. FIG. 2 illustrates two rays $r_1, r_2$ starting in the second material B, which both are directed towards the interface 1. The first ray $r_1$ and the second ray $r_2$ are defining a first incident angle $\gamma_1$ and a second incident angle $\gamma_2$, respectively, with respect to a normal of the interface 1. The first incident angle $\gamma_1$ is smaller than a critical angle $\gamma$, wherein the second incident angle $\gamma_2$ is larger than this critical angle $\gamma$. It is observed that the first incident ray $r_1$ passes the interface 1 into the first material A and is subdued to a refraction. In contrast thereto, the second ray $r_2$ is subdued to a total reflection at the interface 1 and does not leave the second material B. The relevant critical angle $\gamma$ depends on the refractive index of the two materials and increases with the quotient of the first refractive index to the second refractive index according to the formula:

$$\sin(\gamma) = \frac{n_1}{n_2}.$$

It is relevant for the present invention that the critical angle depends on the first material A, i.e. its refractive index $n_1$.

For simplicity of the following description it is assumed that light moves only in the plane of the drawings. However, the principle idea holds true for a three dimensional description as well. A brief comment on differences of the two and the three dimensional world will be given in one of the last paragraphs.

Figure 3:
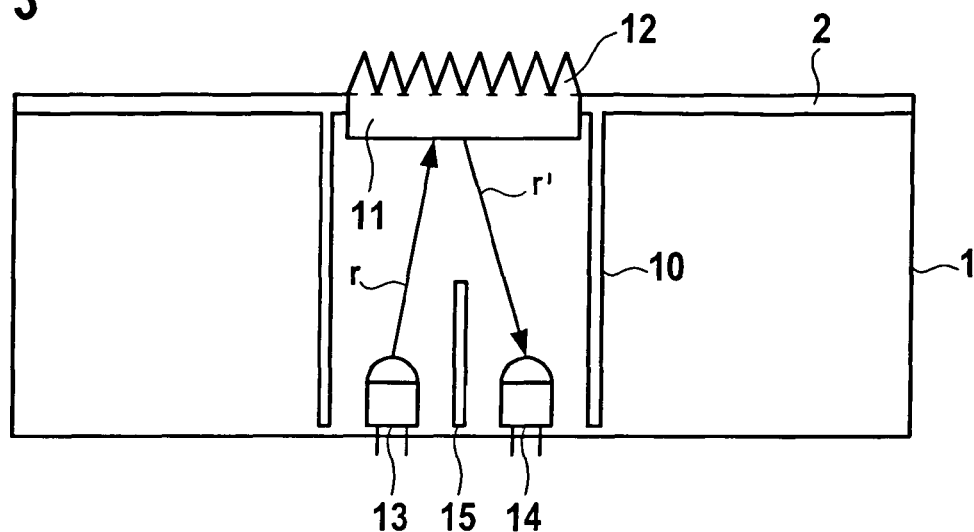
FIG. 3 illustrates a cross-section of a first embodiment of the present invention.

FIG. 3 illustrates a partial cross-section of a first embodiment of the present invention. A housing 1 having a front side 2 is provided. This housing 1 may be for example a housing of an infrared intrusion detection system and the front side 2 one of its entrance windows. In the front side 2 a transparent body 11 is arranged. On the principal surface of the transparent body 11 transparent elevations are formed. The elevations 12 may have a triangular cross-section wherein tips of the triangles are pointing away from the housing 1. Both the transparent body 11 and the transparent elevations 12 may be formed of a transparent plastic material or a glass. A light source 13 and a respective light detector 14 are placed in the housing 1. Light rays r of the light source 13 are emitted in direction to the transparent body 11 and the transparent elevations 12. The ray r may pass the elevations 12 or be reflected by the transparent elevations 11. In latter case the reflected ray r' is detected by the light detector 14. An encapsulation 10 may surround the light source 13 and the light detector 14 for shielding against an incidence of light from other sources. Optionally, an opaque shield 15 is placed between the light source 13 and the light detector 14 such that a direct emission of light towards the detector 14 is circumvented.

Figure 4:
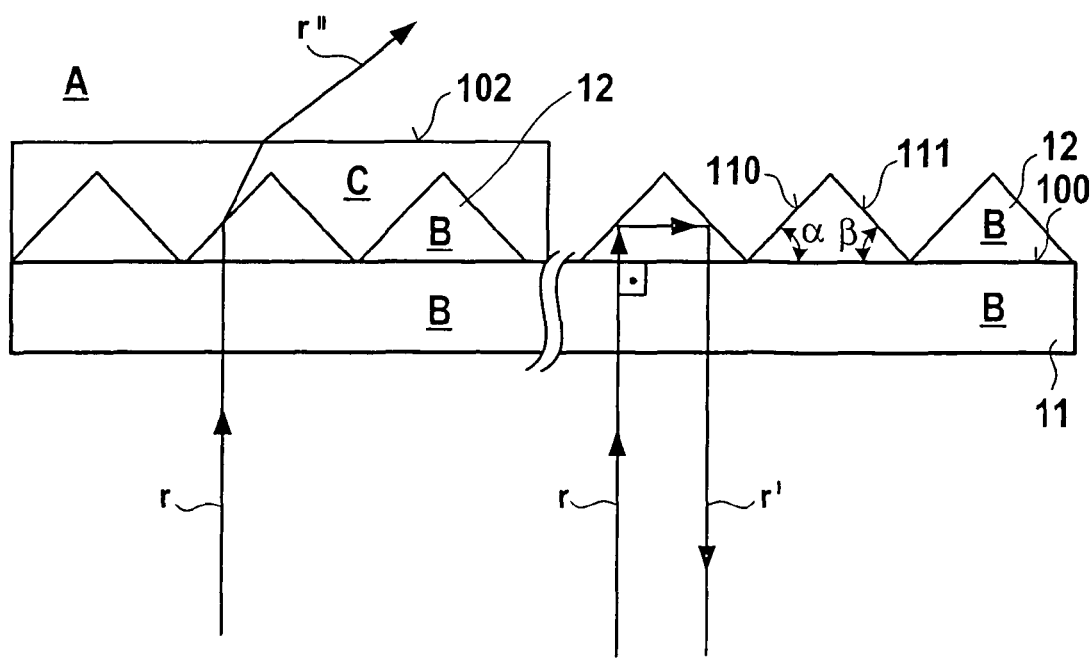
FIG. 4 illustrates the first embodiment in larger scale.

FIG. 4 illustrates the elevations 12 and the transparent body 11 in larger scale. The principles of the elevations 12 hereinafter will be explained in full detail. The transparent elevations 12 are formed on a principal surface 100 of the transparent body 11. The elevations 12 and the transparent body 11 may be in one piece and of the same second material B. But they can be of different materials as well. The second material B is preferably a transparent polymer, e.g. polymethyl methacrylate (PMMA) having a refractive index of 1.49 or a glass having a refractive index of 1.5 or greater.

In this embodiment a cross-section of the transparent elevations 12 shows a triangular shape having opposing facets 110 and 111. In other refinements the opposing facets 110, 111 may form a trapezoid cross-section. The tilted opposing facets 110, 111 are defining pitch angles $\alpha$ and $\beta$, respectively, with respect to the principal surface 100. In this given exemplary embodiment, these pitch angles are all of 45°. It should be stated, that the first and the second pitch angle may be different from each other. Further, the pitch angles may be in a range starting from 42° up to 60°, as will be explained herein after.

FIG. 4 illustrates two different situations. At the right side the elevations are in direct contact to air A and on the left side the elevations are fully covered by a liquid C. The liquid C may be a solution of a spray deposited onto a infrared intrusion detection system and partially on its liquid sensor. Air A has a refractive index in the range of 1.0 to 1.06. Liquids have a refractive index starting at 1.3, at present no liquid is known to have a smaller refractive index. The second refractive index $n_2$ of the elevations 12 is about 1.5, as outlined herein above. According to the given formula the critical angle $\gamma_{ea}$ of an interface elevation to air is about 42° and the critical angle $\gamma_{el}$ of an interface elevation to liquid is greater than 60°.

Rays r are emitted from the light source (not shown) in direction substantially vertical to the principal surface. Or, in other words the incident angles of the rays r on the facets 110, 111 correspond to the pitch angles α, β. The pitch angles are larger than 42°, but smaller than 60°.

Thus for an elevation covered by a liquid C the incident angle of the ray r is smaller than the critical angle $\gamma_{ea}$ (left side). The ray r is refracted and passes through the liquid C into the air A. It is assumed that the surface of the liquid C at its interface to air A is almost flat and substantially in parallel to the principal surface. Therefore, the refracted ray has a small incident angle at the liquid-air interface and the ray is not subdued by a total reflection at the liquid-air interface.

In contrast thereto, the incident angle of the ray r is larger than the critical angle $\gamma_{ea}$ of an interface elevation-air (right side). The ray r is reflected by a first facet 110 and a second time by a second facet 110 opposing the first facet 110. In case of pitch angles α, β of about 45°, the reflected ray r' is reflected or mirrored in a direction parallel to the incident ray r, or be inclined with respect to the incident ray r by a few degrees. The light detector is arranged such that it detects the refracted ray r'. An according signal processing system registers the ray r' on the detector. In absence of the ray r' or for an intensity below a threshold value an alarm signal is generated.

Figure 5:
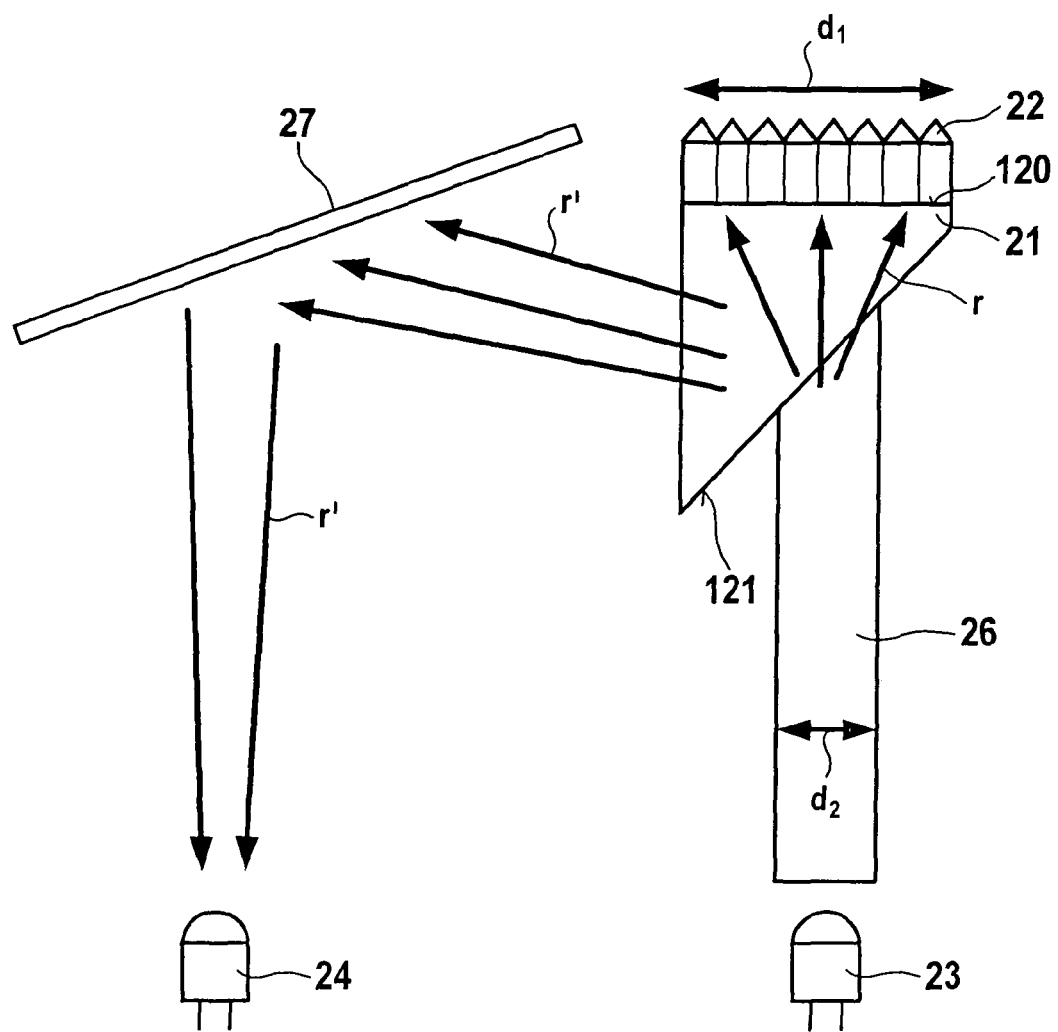
FIG. 5 to FIG. 9 illustrate cross-sections of further embodiments of the present invention.

In FIG. 5, a further refinement of the present invention is illustrated. Transparent elevations 22 are provided on a principal surface 120 of a transparent body 21. A bottom surface 121 arranged opposite to the principal surface 120 is inclined by about 45° to the principal surface 120. A waveguide 26 is provided in direct contact to the bottom surface 121 such that light is emitted from the waveguide 26 in a direction substantially perpendicular to the principal surface 120. An opening of the waveguide 26 is directed towards a light source 23. The waveguide 26 and the transparent body 11 may be formed as one piece. Rays r' reflected by the elevations 22 are reflected by the bottom surface 121 due to a total reflection or a reflective coating at the bottom surface 121. An additional mirror 27 is provided to redirect the ray r' towards a light detector 24. The diameter $d_2$ of the waveguide 26 may be in the range of 2 mm wherein the area of the top 120 surface has a diameter $d_1$ of about 6 mm. The properties and achievements of the elevations correspond to description given along with the FIGS. 3 and 4.

Figure 6:
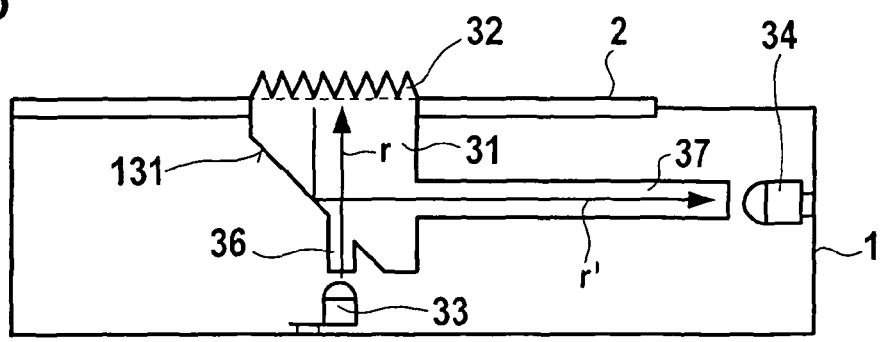

Another refinement of the present invention is illustrated in FIG. 6. A transparent body 31 is provided having two protrusions or waveguides 36, 37 attached to two surfaces. One of these surfaces 131 is inclined by 45° with respect to a principal surface of the transparent body 31 and the other surface is substantially perpendicular to the principal surface. On said principal surface transparent elevations are provided. The transparent body 31, the waveguides and the elevations may be one piece. A light source 33 and a light detector 34 are arranged to emit light into one of the waveguides and to detect light leaving the other waveguide, respectively. The body 31 is arranged in a housing 1 wherein the elevations 32 are projecting out of a front side 2 of the housing.

Figure 7:
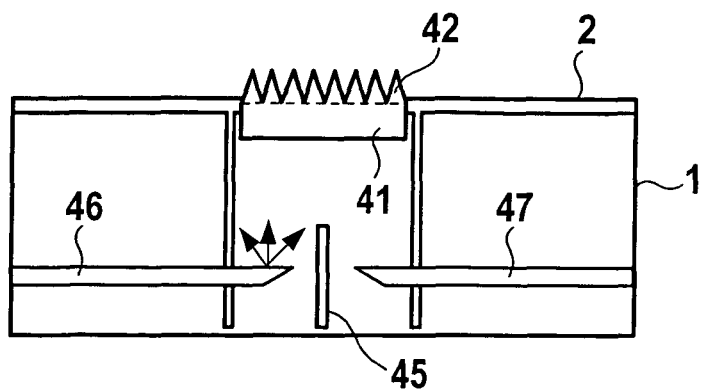

A further refinement is illustrated in FIG. 7. Optical fibres 46, 47 are connected to a light source and a light detector (not shown). The open endings of the fibres 46, 47 are arranged and formed such that light is emitted from the fibres and into the fibres in a direction substantially perpendicular to a principal surface of the transparent body 41. The endings of the fibres may be bent upwards in a direction to the principal surface.

Figure 8:
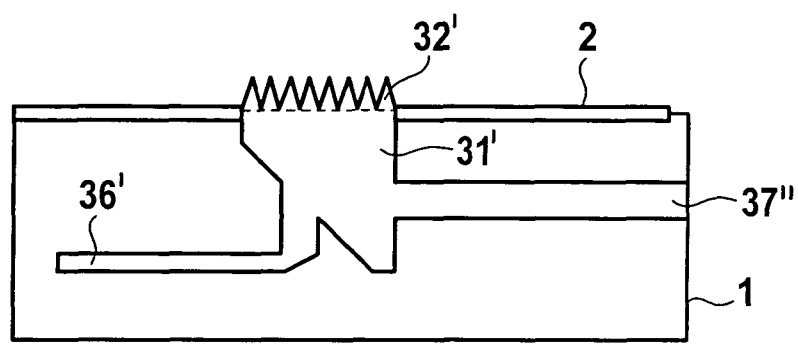

The embodiment of FIG. 6 may be varied such that both wave guides 36', 37' are arranged to guide the rays to a light source and a light detector distant to the elevation 32' (FIG. 8).

Figure 9:
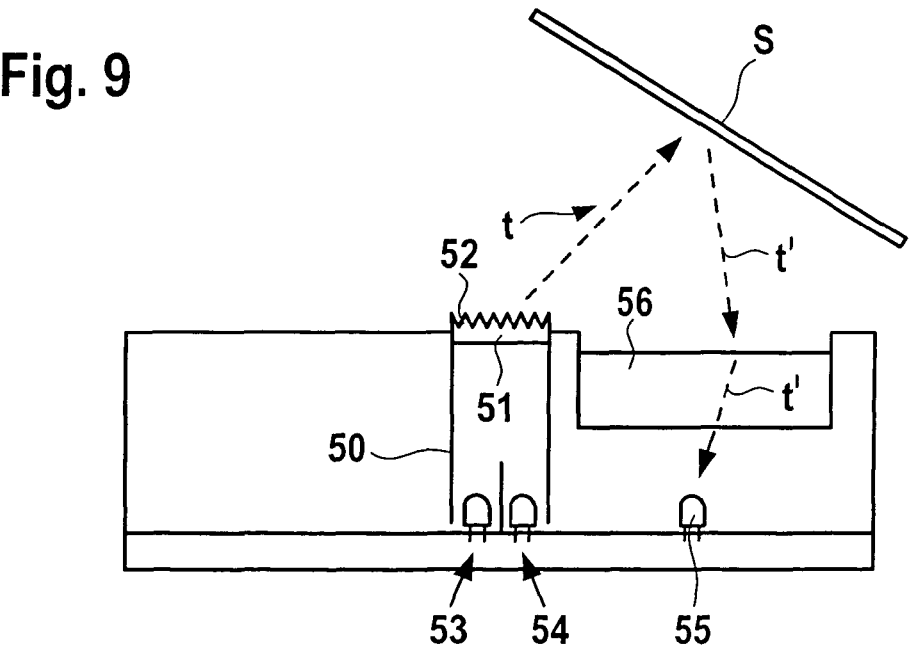

A further embodiment of the present invention is illustrated in FIG. 9. The aforementioned embodiments and refinements are all perfectly suitable for the detection of a deposition of a liquid or a spray onto the principal surface. However, a masking S, e.g. a tissue or a rigid cover, placed over or in front of an infrared intrusion detection system, would not be detected by the liquid sensor. This embodiment, therefore, uses an additional second light sensor 55 placed aside to the liquid sensor having according to the above embodiments a light source 53, a light sensor 54, a transparent body 51 and elevations 52. The second light sensor 55 is shielded from the elevations 52 such that no light of total reflections is scattered towards this second light sensor 55.

There is always at least a small fraction of light from the light source 55 which is not subdued to a total reflection at the transparent elevations. This may be caused by imperfections of the transparent elevations 52 or by areas of the principal surface on which no elevations are placed. Thus, a ray t emitted from the light source 53 falls on a masking S and is scattered or reflected by its surface back towards the infrared intrusion detection system and the second light detector 55. The second light detector 55 registers a difference of the light intensity to a threshold value. Accordingly, a sabotage alarm may be initiated. The second light detector 55 is placed below the entrance window 56 of the infrared intrusion system. This entrance window 56 scatters the light t' towards the second light detector 55.

Figure 10:
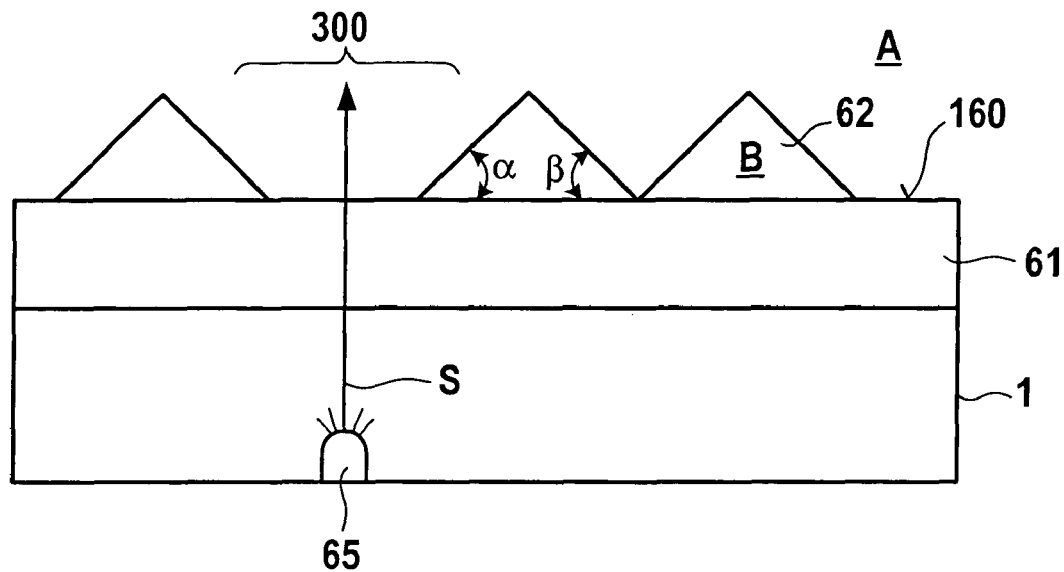
FIG. 10-FIG. 11 illustrate a partial cross-sections of further refinement of the present invention.

A further refinement of the present invention is illustrated in FIG. 10. The status of the liquid sensor and/or an infrared intrusion detection system may be indicated by signalling light sources 65. Rays s emitted by these signalling light sources 65 would be mirrored by the transparent elevations 62. Therefore, areas 200 of the principal surface 160 are planar and/or not provided with elevations.

Figure 11:
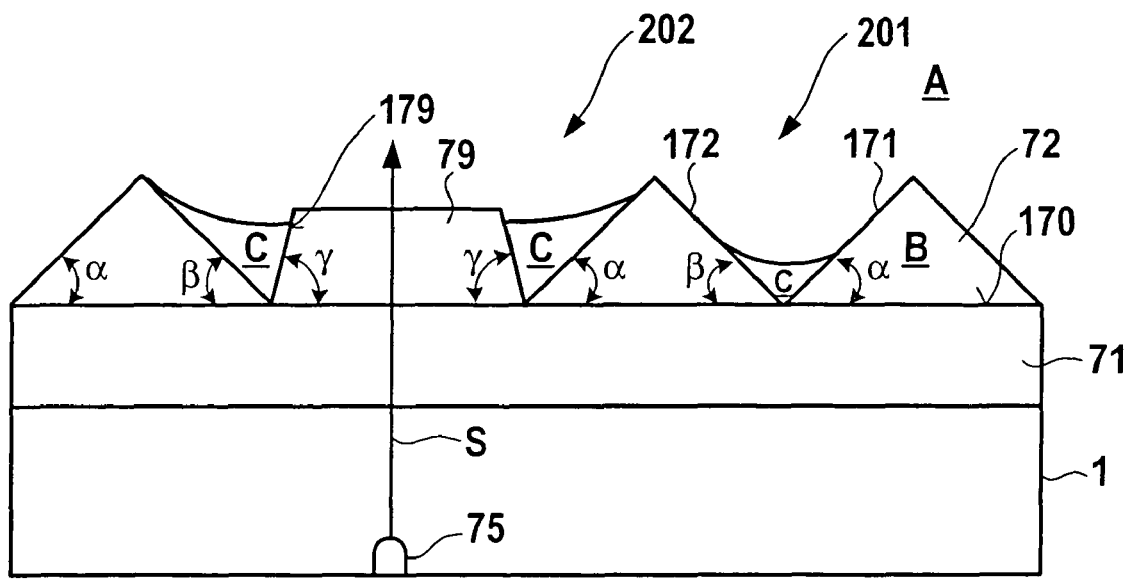

A further refinement is illustrated in FIG. 11. First transparent elevations 72 are arranged on a principal surface 170. These first transparent elevations are provided with first facets 172, 173 defining pitch angles α, β with respect to the principal surface 170 wherein the pitch angles α, β are in the range of 42° to 60°. Adjacent to the first transparent elevations 72 a second type of elevations 79 is arranged. Their second facets 179 are defining a pitch angle φ which is larger than 60°, preferably larger than 75°. Thus, a gap 202 between a first facet 171, 172 and a second facet 179 has a smaller volume than a gap 201 between to first facets 171, 172.

In most cases the liquid sensor will be placed with its principal surface 170 in parallel to a wall. Therefore, it must be ensured that a liquid or a spray does not flow away due to gravity. Further, preferably, most of the principal surface 170 should be covered by a deposited liquid C. By reducing the gaps 202 between the elevations a smaller amount of liquid will be sufficient to fully cover the first facets 171, 172 such that the adhesive forces of the liquid to the elevations are stronger than the weight of the liquid. Additionally, capillarity effects are increased by the smaller gaps 202 and the liquid will be more uniformly dispersed over the principal surface 170. An elevation may be provided with two opposing first facets and second facets. By a corresponding orientation of neighbouring elevations a first facets are arranged adjacent to a second facet.

A top facet of the second elevation 79 may be substantially in parallel to the principal surface 170. These top facets are forming transparent windows for rays s of a signalling light source 75 in the housing 1.

Up to now, it was ignored that there might be a total reflection at the interface liquid air. In principle this total reflection mirrors a ray r back to the light detector. In consequence the light detector detects the same intensity irrespective if a liquid is deposited on the principal surface. A detailed analyse shows that for the above embodiments a total reflection at the interface liquid air occurs only when the liquid forms a layer of uniform thickness on the facets or its thickness increases from the principal surface in direction to the tips of the elevations. In other words, the slope of the interface liquid air increases from the principal surface to the tips of the elevations. A careful analyse for tetrahedron-shaped elevations shows that the slopes have to differ by at least 20°. Adhesive forces tend to maintain the liquid C close to the principal surface where the gap 201, 202 is narrower thus providing at least partially the necessary difference of the slopes. The adhesive forces have a larger effect for smaller elevations. Therefore, the facets are having a diameter of less than 5 mm or even less than 1 mm. Additionally, the gaps between the elevations become filled by small amounts of liquid already.

Figure 12:
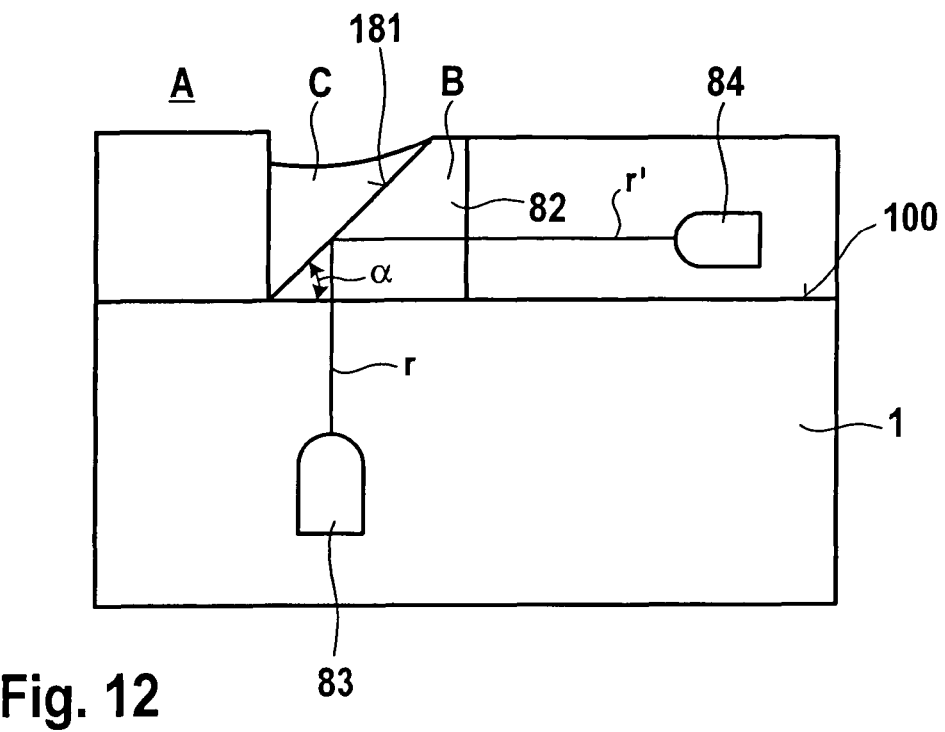
FIG. 12 illustrates a partial cross-section of a further embodiment.

FIG. 12 illustrates the most simplified embodiment of the present invention. An elevation 82 provides one facet 171 only forming an inclined angle α with the first surface 100 in the range of 42° to 60°. In contrast to the above embodiments the ray r emitted by the light source 83 will not be back reflected, but will propagate substantially in parallel to the first surface 100. Therefore, a different arrangement of the light detector 84 is necessary. Either the detector 84 is placed close to the first surface or additional reflective devices are provided to guide the reflected ray r'.

Figure 13:
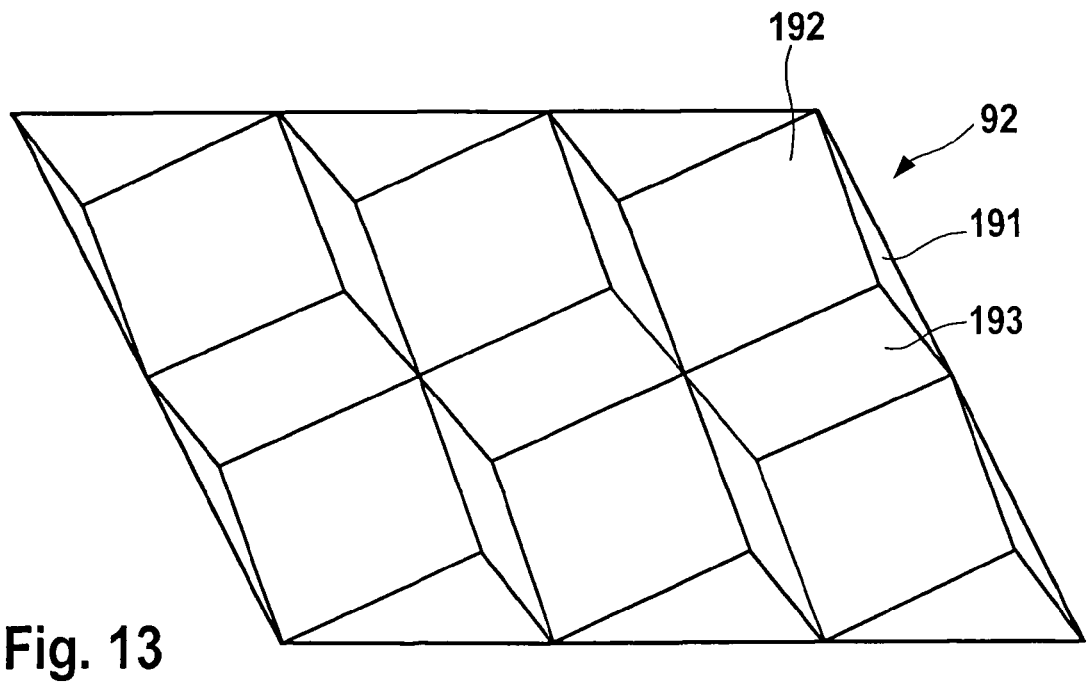
FIG. 13 is a perspective view of a preferred embodiment
Figure 14A:
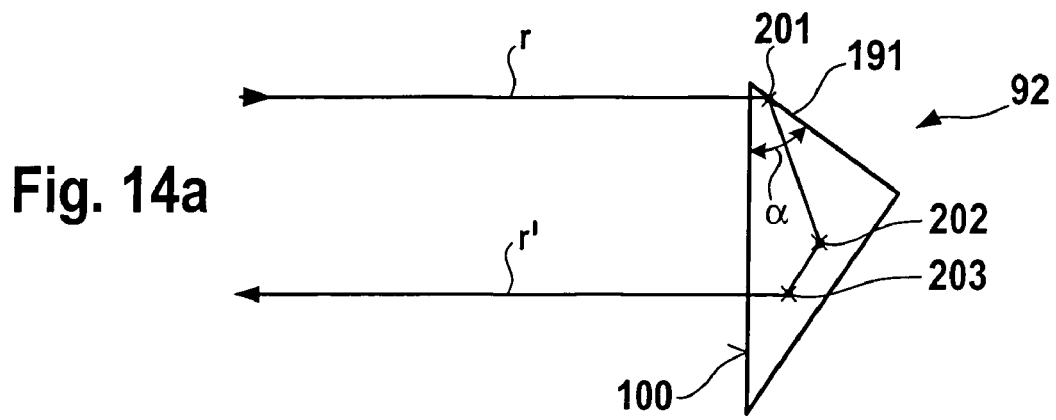
FIG. 14a-14c illustrate a back-reflection in the preferred embodiment of FIG. 13.
Figure 14B:
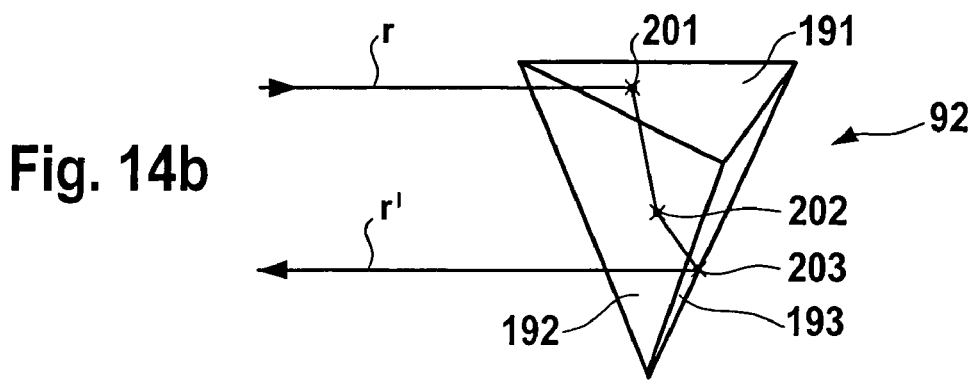
Figure 14C:
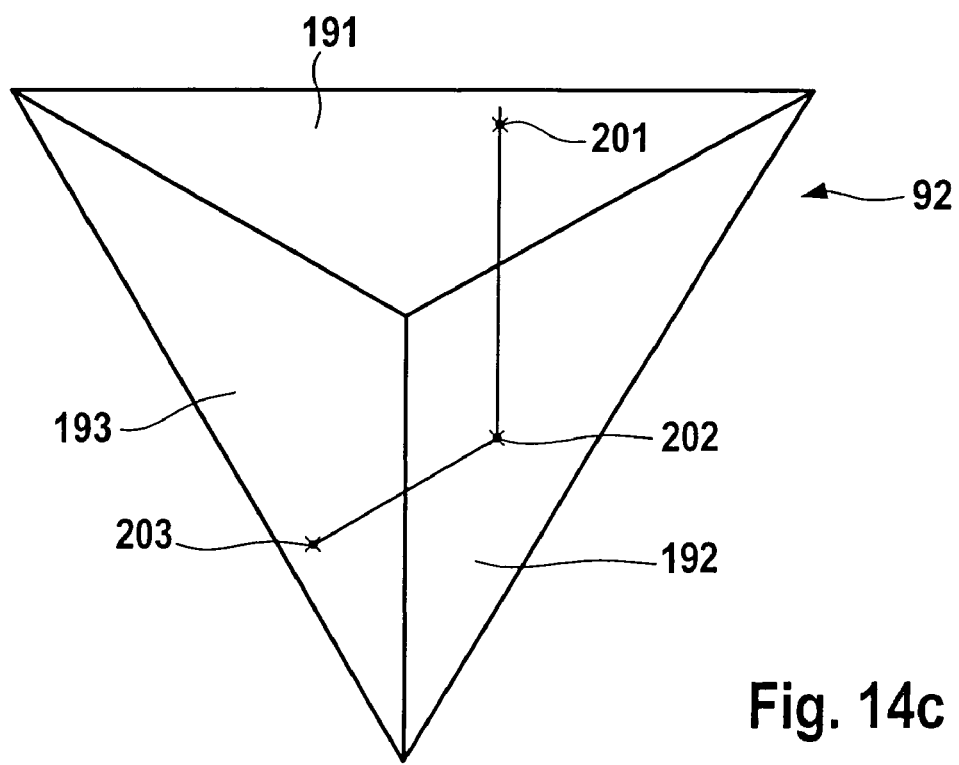

The above description only deals with a two-dimensional description of the elevations. However, one of the most preferred shapes of the elevations is a tetrahedron shape or corner-cube shape (FIG. 13). Thus three facets are reflecting consecutively the ray and directing the ray substantially back towards the light source. For the following the most preferred situation is assumed. All facets are forming an angle of 54.73° with respect to the first surface and angles of 90° with respect to each other. FIG. 14*a*-14*c* are illustrating three consecutive reflections 201, 202, 203 at facets 191, 192, 193 of a tetrahedron 92. The incident ray r is perpendicular to the first facet 191 and the incident angle is therefore 54.73°. The ray is incident on the other two facets 192, 193 at an angle of 54.73° as well. In this case the ray will be perfectly retro-reflected.

Figure 15:
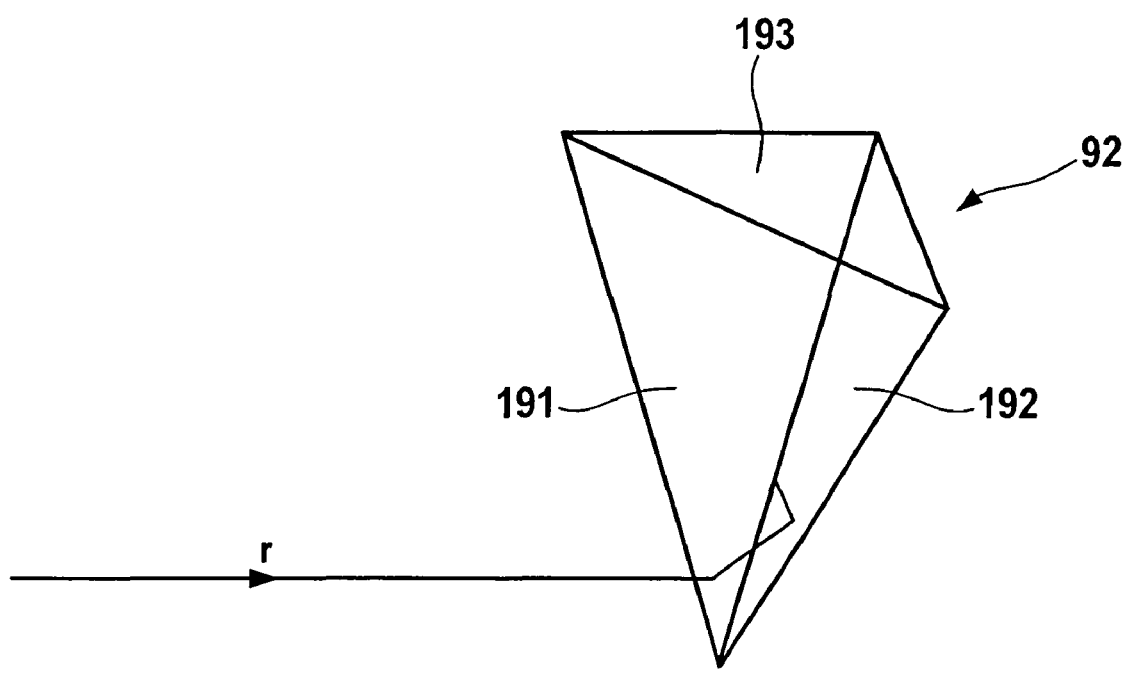
FIG. 15 illustrates a reflection at just two facets of a tetrahedron.

FIG. 15 illustrates that some rays may be incident only on two of the three facets. Most of these rays will leave the elevations, however, some may be recollected and reused.

It should be stated that variations of the incident angle or the inclination angle lead to a complex reflection pattern of the rays. A careful analyse shows that, with the use of non-perfect collimated source, a fraction of the rays will be transmitted in absence of a liquid as well. But a major part will be reflected and thus provide a reliable detection principle for a liquid.

Although the present invention has been described along with preferred embodiments this invention is not limited thereon.

In particular other transparent materials for the elevations having different refractive index may be chosen for the transparent elevation. The range of the pitch angles has to be adapted correspondingly.

REFERENCE NUMERALS

| | |
|---|---|
| r, r', r1, r2, s, t | ray |
| $\gamma_1, \gamma_2$ | incident angle |
| $\gamma, \gamma_{cl}, \gamma_{el}$ | critical angle |
| α, β | first pitch angle |
| φ | second pitch angle |
| I | interface |
| A | first material (air) |

-continued

REFERENCE NUMERALS

| | |
|---|---|
| B | second material (transparent solid) |
| C | liquid |
| O | object |
| S | masking |
| 1 | housing |
| 2 | front side |
| 11, 21, 31, 41, 51, 61, 71 | transparent body |
| 12, 22, 32, 42, 52, 62, 72, 82, 92 | transparent first elevation |
| 13, 23, 33, 43, 53, 63, 73, 83 | light source |
| 14, 24, 34, 44, 54, 64, 74, 84 | light detector |
| 15 | opaque barrier |
| 26, 36, 37 | wave guide |
| 27 | mirror |
| 46, 47 | optical fibre |
| 55 | second light detector |
| 65, 75 | signalling light source |
| 79 | second elevation |
| 90 | housing |
| 91 | light detector |
| 92 | entrance window |
| 94 | spray |
| 110, 111, 171, 172, 181, 191, 192, 193 | first facet |
| 100, 120, 160, 170 | principal surface |
| 121, 131 | inclined surface |
| 179 | second facet |
| 200 | area |
| 201, 202 | gap |

The invention claimed is:

1. An intrusion detector including a sensor arrangement for detecting a liquid (C) applied on an exposed surface (100, 120, 160, 170) to render the intrusion detector inoperable, the sensor arrangement comprising:

at least one transparent elevation (12, 22, 32, 42, 52, 62, 72) formed on the exposed surface (100, 120, 160, 170), wherein the transparent elevation (12, 22, 32, 42, 52, 62, 72) is made of a first transparent material (B), wherein at least one first facet (110, 111, 171, 172, 181) of the transparent elevation (12, 22, 32, 42, 52, 62, 72) defines a first angle (α, β) with the exposed surface (100, 120, 160, 170), and wherein the first angle (α, β) is larger than an angle at which a total reflection occurs at an interface of the first transparent material (B) and air (A) and is smaller than an angle at which a total reflection occurs at an interface of the first transparent material (B) and the liquid (C) applied on the exposed surface to render the intrusion detector inoperable;

at least one second elevation (12, 22, 32, 42, 52, 62, 72; 79) having a second facet (179) formed adjacent to the first facet (110, 111,171, 172, 181) of the transparent elevation (12, 22, 32, 42, 52, 62, 72), wherein the second facet (179) defines a second angle with the exposed surface (100, 120, 160, 170), which second angle is larger than 75° in order to enhance capillarity effects of the liquid (C) applied on the exposed surface to render the intrusion detector inoperable;

a light source (13, 23, 33, 43, 53, 63, 73) arranged for emitting an incident ray (r) into a first direction such that the incident ray (r) passes through the exposed surface (100, 120, 160, 170) into one of the transparent elevation (12, 22, 32, 42, 52, 62, 72) and the second elevation (12, 22, 32, 42, 52, 62, 72; 79), such that in a presence of the liquid (C) at one of the first facet (110, 111, 171, 172) and the second facet (179), the incident ray is transmitted through the first facet (110, 111, 171, 172) or the second facet (179), wherein in an absence of the liquid (C), the incident ray is reflected due to a total reflection at the first facet (110, 111, 171, 172) or the second facet (179); and a light detector (14, 24, 34, 44, 54, 64, 74) for detecting the reflected incident ray (r') at one of the first facet and the second facet to recognize that the liquid (C) is applied to the exposed surface to render the intrusion detector inoperable.

2. The sensor arrangement according to claim 1 characterized in that the elevation (12, 22, 32, 42, 52, 62, 72) has a tetrahedron-shape and three first facets.

3. The sensor arrangement according to claim 1 characterized in that the elevation (12, 22, 32, 42, 52, 62, 72) is formed with a triangular or trapezoid cross-section.

4. The sensor arrangement according to claim 1 characterized in that the second transparent material (B) has a refractive index of more than about 1.5 and the first angle is in the range of 42° to 60°.

5. The sensor arrangement according to claim 1 characterized in that an angle defined by two adjacent first facets of at least one elevation is different to 90°.

6. The sensor arrangement according to claim 1 characterized in that first direction is substantially perpendicular to the surface (100, 120, 160, 170).

7. The sensor arrangement according to claim 1 characterized in that a second light detector (55) is provided for detecting a ray (t) reflected at an object placed (S) in front of the elevations (12, 22, 32, 42, 52, 62, 72).

8. The sensor arrangement according to claim 1 characterized in that the light source (22, 32) and/or the light detector (24, 34) comprises a wave guide (26, 36, 37).

9. The sensor arrangement according to claim 1 characterized in that the second elevations are provided with a top facet being substantially parallel to the surface or regions such that a ray emitted via a signalizing optical light source passes the elevation at the top facet.

\* \* \* \* \*